(12) United States Patent
Kothari et al.

(10) Patent No.: US 7,536,678 B2
(45) Date of Patent: May 19, 2009

(54) SYSTEM AND METHOD FOR DETERMINING THE POSSIBILITY OF ADVERSE EFFECT ARISING FROM A CODE CHANGE IN A COMPUTER PROGRAM

(75) Inventors: Ravi Kothari, New Delhi (IN); Natwar Modani, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 957 days.

(21) Appl. No.: 10/727,890

(22) Filed: Dec. 4, 2003

(65) Prior Publication Data

US 2005/0125776 A1 Jun. 9, 2005

(51) Int. Cl.
G06F 9/45 (2006.01)
(52) U.S. Cl. ...................................... 717/124
(58) Field of Classification Search ................... 717/124
See application file for complete search history.

(56) References Cited

U.S. PATENT DOCUMENTS

| | | | |
|---|---|---|---|
| 5,694,540 A | 12/1997 | Humelsine et al. | |
| 6,336,217 B1 | 1/2002 | D'Anjou et al. | |
| 6,601,233 B1 * | 7/2003 | Underwood | 717/102 |
| 6,609,128 B1 * | 8/2003 | Underwood | 707/10 |
| 2003/0018950 A1 | 1/2003 | Sparks et al. | |
| 2004/0024807 A1 * | 2/2004 | Cabrera et al. | 709/201 |
| 2005/0160411 A1 * | 7/2005 | Sangal et al. | 717/144 |

FOREIGN PATENT DOCUMENTS

WO WO 98/57260 A1 12/1998

OTHER PUBLICATIONS

Reider Cornadi and Bernhard Westfechtel, Version Models for Software Configuration Management, ACM Digital Library, ACM Computing Surveys (CSUR), Jun. 1998, pp. 232-282, vol. 30, Issue 2.
Sang-Uk Jeong, Joon-Sang Lee, Doo-Hwan Bae, An Automated Refactoring Approach to Design Pattern-based Program Transformations in Java Programs (Abstract), INSPEC Accession No. 7503557, 2003.
Cobo H, Mauco V, Romero, M, Rodriguez, C, A Tool to Reengineer Legacy Systems to Object-oriented Systems (Abstract), INSPEC Accession No. 6709095, 2000.

(Continued)

*Primary Examiner*—John Chavis
(74) *Attorney, Agent, or Firm*—Gibb & Rahman, LLC

(57) ABSTRACT

A system and method determine the possibility of adverse effect arising from a code change in a computer program. The system and method comprise the steps of identifying important classes within a computer program and determining directly and indirectly dependent classes of the important classes. The important classes comprise superclasses of the directly and indirectly dependent classes. The method associates test cases with the important classes and with the directly and indirectly dependent classes. Additionally, for a given code change to first important class, the method runs all test cases associated with the first important class and associated with dependent classes of the first important class, and indicates the possibility of an adverse effect if any run test case fails.

20 Claims, 5 Drawing Sheets

OTHER PUBLICATIONS

Lee, M, Offutt, JA., Alexander, R.T., Algorithmic Analysis of the Impacts of Changes to Object-orientated Software (Abstract), INSPEC Accession No. 6691618, 2000.

Ajrnal Chaumun, M., Kabaili. H., Keller, R.K., Lustman, F., Saint-Denis, G., Design Properties and Object-orientated Software changeability (Abstract), INSPEC Accession No. 6514889, 2000.

Kyung-Hee Kim, Jai-Nyun Park, Yong-Ik Yoon, A Graph of Change Impact Analysis for Distributed Object Orientated Software (Abstract), INSPEC Accession No. 6440895, 1999.

Kung, D., Gao, J., Hsia, P., Wen, F., Toyoshima, Y., Chen, C., Change Impact Identification in Object Orientated Software Maintenance (Abstract), INSPEC Accession No. 4785205, 1995.

Goldmann, S., A Model of Planning and Enactment Support in Complex Software Development Projects (Abstract), INSPEC Accession No. 7503557, 2003.

Kung, et al., "A Reverse Engineering Approach for Software Testing of Object-Oriented Programs," XP-010329582, 1999, 8 pages.

D. Kung, P. Hsia, Y. Toyoshima, C. Chen, J. Gao, Object-Oriented Software Testing-Some Research and Development, *IEEE*, 158-165, 1998.

J. Bieman, A. Andrews, H. Yang, Understanding Change-Proneness in OO Software Through Visualization, *IEEE, International Workshop on Program Comprehension(IWPC)*, 2003.

L. Barowski, J. Cross, II, Extraction and Use of Class Dependency Information for Java, IEEE, Working Conference on Reverse Engineering (WCRE), 2002.

\* cited by examiner

SYSTEM AND METHOD FOR DETERMINING THE POSSIBILITY OF ADVERSE EFFECT ARISING FROM A CODE CHANGE IN A COMPUTER PROGRAM

FIELD OF THE INVENTION

The present invention relates to the field of software development, and to large scale computer programs exhibiting complexity. It relates particularly to determining the possibility of adverse effects in other components of the program arising from code changes elsewhere in the program.

BACKGROUND

Any large software product/program is most usually developed by large, numerous and possibly geographically distributed teams of programmers. This presents several challenges. One of the challenges is to ensure that code changes introduced in one component (or part) do not affect the correct execution of other dependent components (or parts). The dependency of such components can be due to referencing a type, or due to consuming data produced by that type. Typically, the dependency between the various components is not known accurately, due to incomplete specifications or due to the specification not being up-to-date.

One approach to this problem is manually trying to identify adverse affects (leading to errors), but this is quite impractical for complex software.

U.S. Pat. No. 5,694,540, issued to Humelsine et al on Dec. 2, 1997, teaches a set of tests to run on a computer program as a regression test that provides an approximation to the level of testing that is achieved by full regression. A modification request is associated with a test case and the files that change due to the modification are recorded. The test cases associated with the files that are modified by the modification are run.

US Patent Publication No. 2003/0018950A1, in the name Sparks et al, published on Jan. 23, 2003, describes an approach where classes are dynamically reloaded if a code change is detected. A developer can see the result of a change after a build/package step.

These known methods provide only a partial solution to predicting adverse effects. There thus remains a need for an automated approach to more completely detecting adverse effects in other program components resulting from code changes.

SUMMARY

The invention provides a method for determining the possibility of adverse effect arising from a code change in a computer program. The method identifies important classes within a computer program. The method determines, directly and indirectly, dependent classes of the important classes. The important classes comprise superclasses of the directly and indirectly dependent classes. The method associates test cases with the important classes and with the directly and indirectly dependent classes. For a given code change to a first important class, the method runs all test cases associated with the first important class and associated with dependent classes of the first important class, and indicates the possibility of an adverse effect if any run test case fails.

DETAILED DESCRIPTION

Definition of Terms

It is useful to introduce a few terms:

Class: any type (e.g., classes and interfaces in Java™) in an object oriented programing language is a "class".

Test Case: Test cases are used to verify the correctness of the software. These can be of various types, e.g., "unit test", "functional test", "system test". These are collectively called "test cases".

Figure 1:
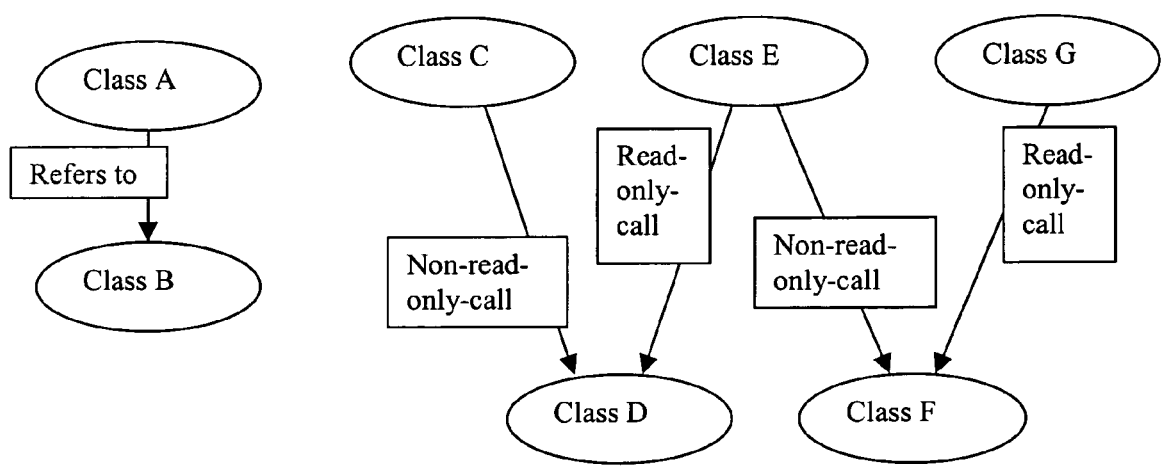
FIG. 1 is a diagram illustrating class dependencies.

Dependency: Consider the example given in FIG. 1. Class A has a direct dependency on class B, as A refers to B. Class C modifies persistent data represented by class D, which is consumed by class E in turn modified persistent data represented by class F. This data (class F) is consumed by class G. Therefore, both class E and class G have indirect dependency on class C. Any change in class C can potentially affect classes E and G.

Overview

An embodiment of the invention will be given using the example of Java™ programing language, being one type of object oriented programing languages.

Figure 2:
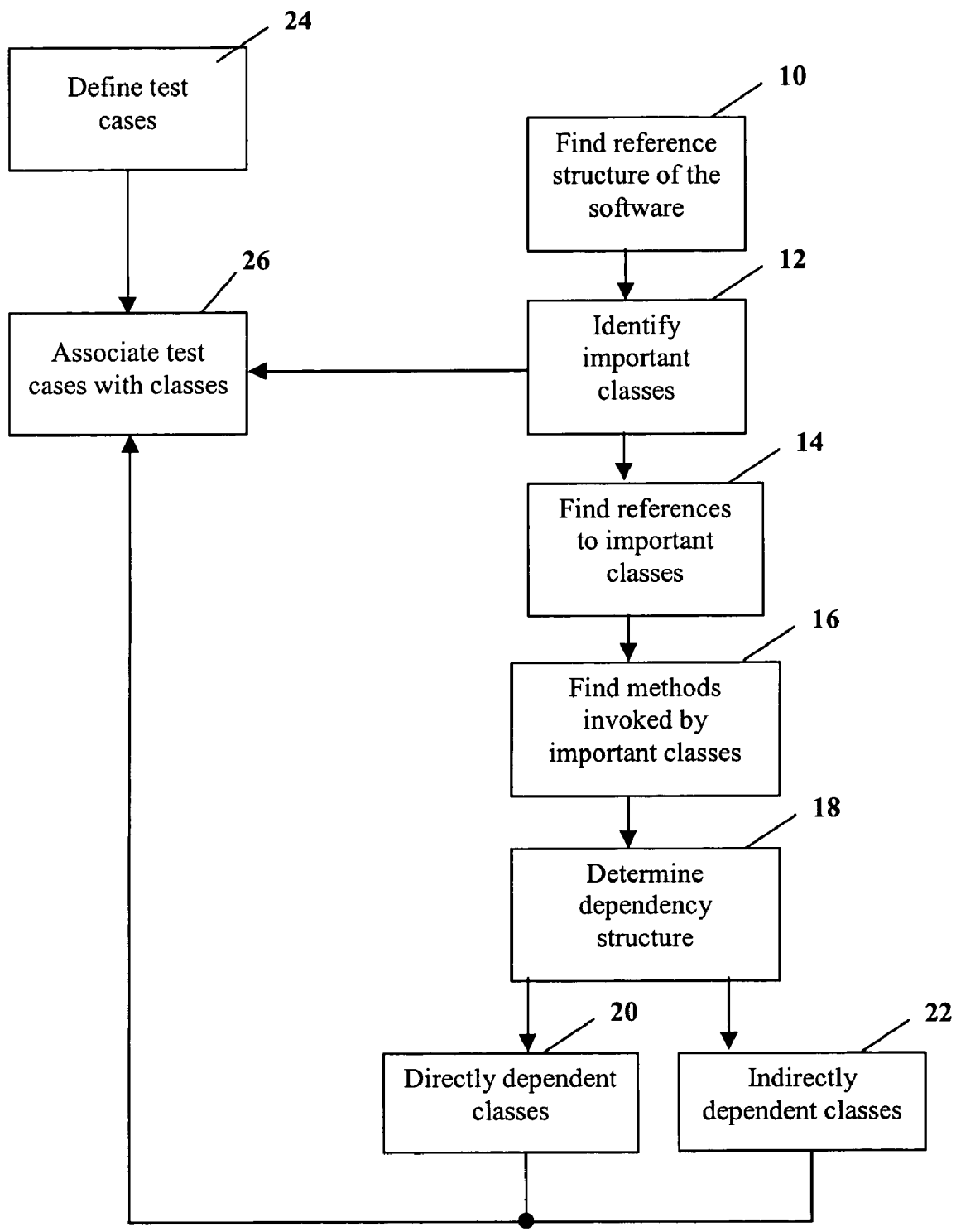
FIG. 2 is a flow diagram of an initialization process.

The method broadly includes of the initial steps, as shown in FIG. 2.

The reference structure of the software is found (step 10). Next, the important classes of the software are identified (step 12). These important classes include the classes used for representing the persistent data (e.g., the entity bean in a J2EE environment). Next, the references to the important classes are found (step 14) and the methods that are invoked for each of the important classes are found (step 16).

The dependency structure of the software is now determined (step 18), leading to identifying the directly dependent classes (step 20) and the indirectly dependent classes (step 22). The indirect dependencies are identified by looking for a producer/consumer relation for persistent data. The producer of data is a class that makes a non-read-only call (possibly in addition to some read-only calls) to the classes representing the persistent data, while the consumer of data is a class that makes a read-only call to the classes representing the persistent data.

The test case or cases for each class are now defined (step 24). This involves specifying a set of steps to be performed and the expected results at each step. The authors of such test cases are skilled programmers, and the nature of the test cases depends upon the software high level specficiations. In execution, if all the steps give the expected results, then the test case is considered to be successful. The test cases are associated with the "important" and dependent classes (step 26).

Figure 3:
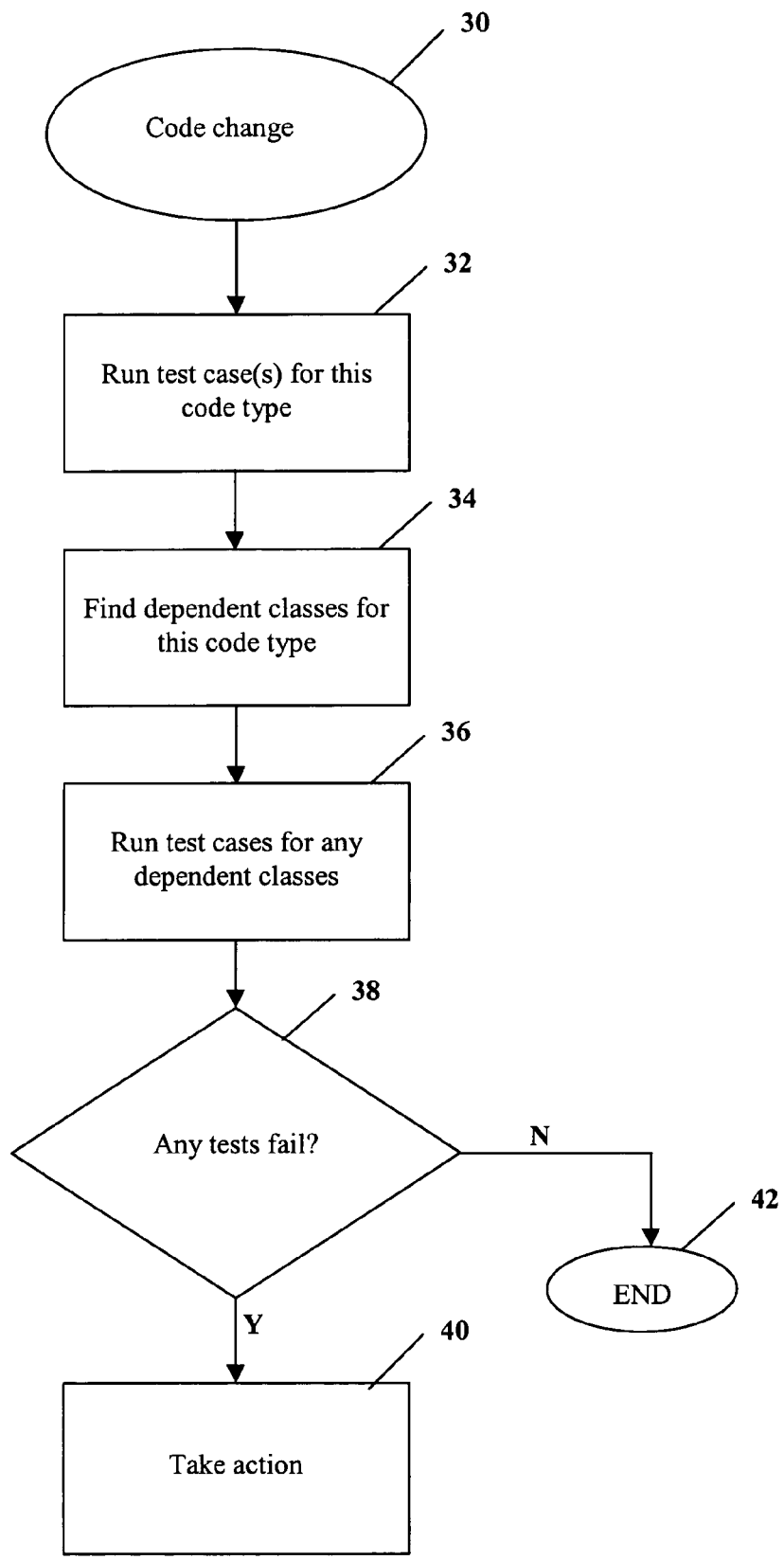
FIG. 3 is a flow diagram of determining the possibility of adverse effects from code changes.

Now, with reference to FIG. 3, when the code for a particular class is changed (step 30), the test case or cases associated with it are run (step 32). The dependent (i.e. both direct and indirect) classes for this type are also found (step 34), and the associated test cases are run (step 36). If a class is not important, then there will not be any associated test case to be run.

If any of the test cases fail (step 38) then appropriate action is taken (step 40), else the process ends (step 42). Such action can include informing the programmer, who can decide whether to retain the changes made in the code, or not.

If the developer wants to retain the changes, then the farther action to take is to notify the owners of the classes for which test cases failed, including the details of change in the code triggered this failure.

Detailed Implementation

Identifying the Important Classes

Typically, a large software program would define a template of the important classes by providing a set of classes and/or interfaces that the important business classes must extend/implement. These templates serve as the start points. For example, some of the important business classes/interfaces in the IBM WebSphere Commerce™ suite are the controller command interfaces, controller command implementation classes, task command interfaces, task command implementation classes, etc. Each controller command interface must extend a particular interface called com.ibm.commerce.command.ControllerCommand, either directly or by extending another interface, which is a controller command interface in turn.

Figure 4:
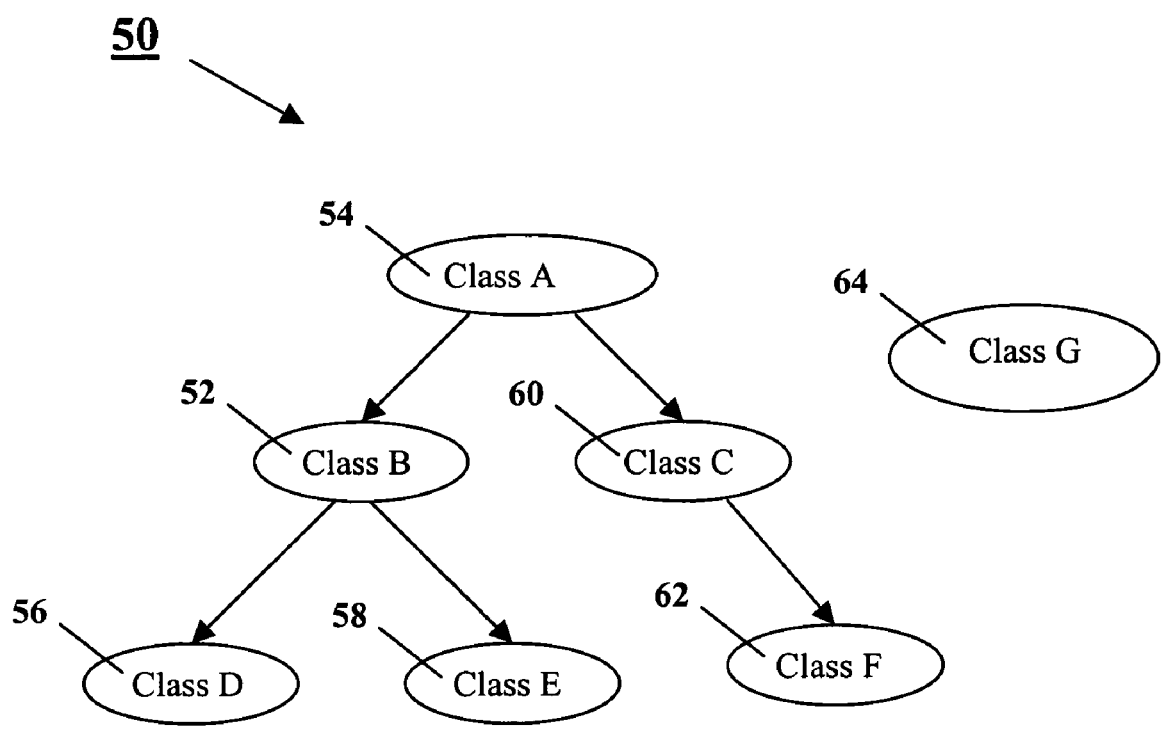
FIG. 4 shows the inheritance structure of a set of classes.

To identify the important classes, the source (or the object) code is scanned to find the class names and their super classes (the classes this class is extending and/or implementing). A graph of the inheritance structure is then built using this information. This graph, in one form, is a directed acyclic graph 50 as shown in FIG. 4. Node B 52 is a direct descendent of node A 54 in this graph if node B is a super class of node A. Node D 56 is an indirect descendent of node A if node C 60 is a direct or indirect descendent of node B, where node B, in turn, is a direct or indirect descendent of node D. Node G 62 is not a descendent or super class of any other node. All the direct or indirect descendents of the start points are important classes. Beginning at each start point, the important types are found from the graph using a depth first search or a breadth first search. For a start point of node B 52, the important classes are class B itself, and classes D and E.

Finding References to a Given Class

There are a number standard utilities available to find the references to a given class. Additionally, utilities are also able to indicate which members of the given class are being accessed. By using any such utility, each method in the given class is represented by the set (possibly ordered) of member accesses of the important classes as identified above. The entire cell graph is generated, then filtered to remove all the classes that are not within the set of important classes.

A suitable utility is described in a document A Guide to the Information Added by Document Enhancer for Java, published by IBM Haifa Research Labs, Haifa, Israel, incorporated herein by reference. The utility can be downloaded from: http://www.haifa.il.ibm.com/proj Esc/systems/ple/DEJava/index.html.

Using the Reference to Important Classes Information to Find the Dependencies

The direct dependencies are easily found. If there is a reference to a given class, it is a direct dependency.

To detect an indirect dependency, the classes that represent the persistent data are found. The user has to provide the template for the classes representing the persistent data in the set of start points, and indicate that these templates represent persistent data. All the classes that have these start points as their direct or indirect descendents are found, and marked as classes representing persistent data. For example, in a typical J2EE environment, the persistent data is represented by the Entity Beans. So, the set of all Entity Beans represent the persistent data with which the software interacts. The classes that modify the persistent data are then found by looking for non-read-only calls to the Entity Beans. In this way the producer of the data is identifier. The consumer of data is one that makes read-only calls to Entity Beans. Given this producer/consumer relation for the data, the indirect dependencies are found.

Computer Hardware and Software

Figure 5:
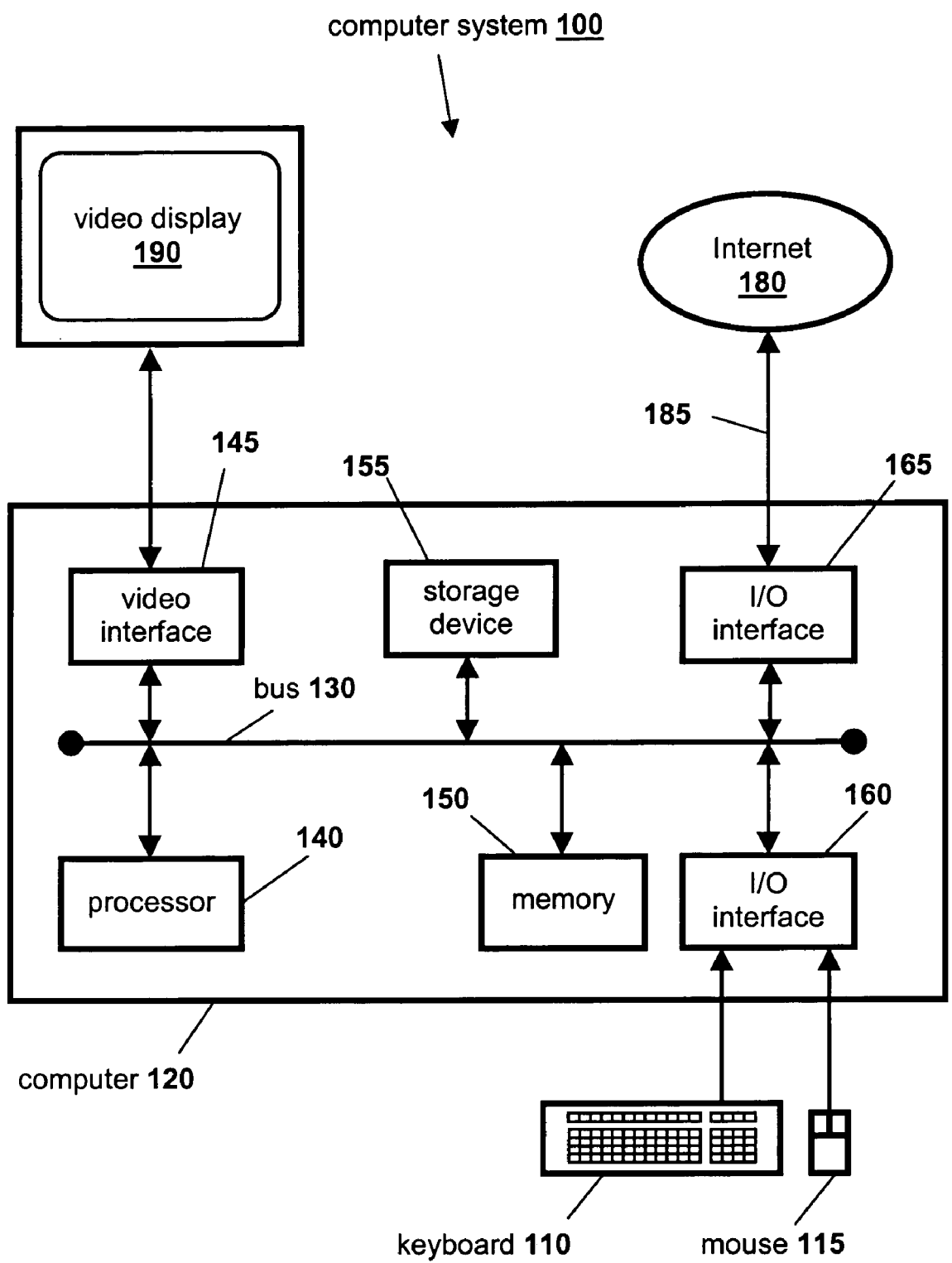
FIG. 5 is a schematic representation of a computer system suitable for performing the techniques described with reference to FIGS. 2 to 4.

FIG. 5 is a schematic representation of a computer system 100 that can be used to implement the diagnostic techniques described herein. The computer system 100 can be thought of as a programmer's work station. Computer software executes under a suitable operating system installed on the computer system 100 to assist in performing the described techniques. This computer software is programed using any suitable computer programing language, and may be thought of as comprising various software code means for achieving particular steps.

The components of the computer system 100 include a computer 120, a keyboard 110 and mouse 115, and a video display 190. The computer 120 includes a processor 140, a memory 150, input/output (I/O) interfaces 160, 165, a video interface 145, and a storage device 155.

The processor 140 is a central processing unit (CPU) that executes the operating system and the computer software executing under the operating system. The memory 150 includes random access memory (RAM) and read-only memory (ROM), and is used under direction of the processor 140.

The video interface 145 is connected to video display 190 and provides video signals for display on the video display 190. User input to operate the computer 120 is provided from the keyboard 110 and mouse 115. The storage device 155 can include a disk drive or any other suitable storage medium.

Each of the components of the computer 120 is connected to an internal bus 130 that includes data, address, and control buses, to allow components of the computer 120 to communicate with each other via the bus 130.

The computer system 100 can be connected to one or more other similar computers via a input/output (I/O) interface 165 using a communication channel 185 to a network, represented as the Internet 180. In this way, a distributed team can co-operate in terms of portions of code being written or hosted from the other locations.

The computer software may be recorded on a portable storage medium, in which case, the computer software program is accessed by the computer system 100 from the storage device 155. Alternatively, the computer software can be accessed directly from the Internet 180 by the computer 120. In either case, a user can interact with the computer system 100 using the keyboard 110 and mouse 115 to operate the programmed computer software executing on the computer 120.

Other configurations or types of computer systems can be equally well used to implement the described techniques. The computer system 100 described above is described only as an example of a particular type of system suitable for implementing the described techniques.

CONCLUSION

As a tool, the methodology greatly reduces the debugging effort required to manage the code in a distributed development environment.

Various alterations and modifications can be made to the techniques and arrangements described herein, as would be apparent to one skilled in the relevant art.

We claim:

1. A method for determining the possibility of adverse effect arising from a code change in a computer program, comprising the steps of:
   identifying important classes within a computer program;
   determining directly and indirectly dependent classes of said important classes, wherein said important classes comprise superclasses of said directly and indirectly dependent classes;
   associating test cases with said important classes and with said directly and indirectly dependent classes; and
   for a given code change to first important class:
      running all test cases associated with said first important class and associated with dependent classes of said first important class; and
      indicating the possibility of an adverse effect if any run test case fails.

2. The method according to claim 1, wherein the identification of important classes includes building an inheritance structure of class names and super classes of said program, and from which said structure start points and direct and indirect descendants thereof are identified.

3. The method according to claim 2, wherein determining dependent classes includes:
   finding references in said program to said important classes;
   finding methods invoked by said important classes; and
   determining a dependency structure of said methods that incorporates said dependent classes.

4. The method according to claim 3, wherein determining said dependency structure further includes identifying both directly dependent and indirectly dependent classes, said indirectly dependent classes exhibiting a producer/consumer relation for persistent data.

5. The method according to claim 1, wherein indicating an adverse step includes generating a program output.

6. The method according to claim 1, wherein said directly and indirectly dependent classes of a given important class directly refer to said given important class or consume data from said given important class.

7. A method for determining the possibility of adverse effect arising from a code change in a computer program having a plurality of classes, comprising the steps of:
   identifying important ones of said classes;
   determining directly and indirectly dependent classes of said important classes, wherein said important classes comprise superclasses of said directly and indirectly dependent classes;
   associating test cases with said classes and with said directly and indirectly dependent classes; and
   for a given code change to a first class:
      running all test cases associated with said first class and associated with dependent classes of said first class; and
      indicating the possibility of an adverse effect if any run test case fails.

8. The method according to claim 7, wherein the identification of important classes includes building an inheritance structure of class names and super classes of said program, and from which said structure start points and direct and indirect descendants thereof are identified.

9. The method according to claim 8, wherein determining dependent classes includes:
   finding references in said program to said important classes;
   finding methods invoked by said important classes; and
   determining a dependency structure of said methods that incorporates said dependent classes.

10. The method according to claim 9, wherein determining said dependency structure further includes identifying both directly dependent and indirectly dependent classes, said indirectly dependent classes exhibiting a producer/consumer relation for persistent data.

11. The method according to claim 7, wherein indicating an adverse step includes generating a program output.

12. A data processing system comprising:
    a memory storing a program, the program having a plurality of classes;
    a user input by which program code changes can be made;
    a processor operable to
       identify important ones of said classes, determine directly and indirectly dependent classes of said important classes, wherein said important classes comprise superclasses of said directly and indirectly dependent classes, and
       associate test cases with said classes and with said directly and indirectly dependent classes, and
    wherein for a given code change to a first class input via said user input, said processor runs all test cases associated with said first class and associated with dependent classes of said first class; and
    further comprising:
       an output means by which a program output is generated to indicate the possibility of an adverse effect if any run test case fails.

13. The data processing system according to claim 12, wherein said processor is further operable to identify important classes by building an inheritance structure of class names and super classes of said program, and from which said structure start points and direct and indirect descendants thereof are identified.

14. The data processing system according to claim 13, wherein said processor is further operable to determine dependent classes by finding references in said program to said important classes, finding methods invoked by said important classes, and determining a dependency structure of said methods that incorporates said dependent classes.

15. The data processing system according to claim 14, wherein said processor is further operable to determine said dependency structure by identifying both directly dependent and indirectly dependent classes, said indirectly dependent classes exhibiting a producer/consumer relation for persistent data.

16. The data processing system according to claim 12, wherein said directly and indirectly dependent classes of a given important class directly refer to said given important class or consume data from said given important class.

17. A computer program product comprising a computer program carried on a storage medium, said computer program comprising:
    a program code element having a plurality of classes;
    a code element for identifying important ones of said classes;
    a code element for determining directly and indirectly dependent classes of said important classes, wherein said important classes comprise superclasses of said directly and indirectly dependent classes;
    a code element for associating test cases with said classes and with said directly and indirectly dependent classes;
    a code element for running all test cases associated with a first class and associated with dependent classes of said first class contingent upon a given code change to said first class within said program code element; and a code element for indicating the possibility of an adverse effect if any run test case fails.

18. The computer program product according to claim 17, wherein said directly and indirectly dependent classes of a given important class directly refer to said given important class or consume data from said given important class.

19. A computer program product comprising computer program carried on a storage medium, said computer program comprising:

a program code element having a plurality of classes;

a code element for identifying important classes within a computer program;

a code element for determining directly and indirectly dependent classes of said important classes, wherein said important classes comprise superclasses of said directly and indirectly dependent classes;

a code element for associating test cases with said important classes and with said directly and indirectly dependent classes;

a code element for running all test cases associated with a first class and associated with dependent classes of said first class contingent upon a given code change to said first class within said program code element; and a code element for indicating the possibility of an adverse effect if any run test case fails.

20. The computer program product according to claim 19, wherein said directly and indirectly dependent classes of a given important class directly refer to said given important class or consume data from said given important class.

* * * * *